United States Patent [19]

Nakabe et al.

[11] 4,157,566
[45] Jun. 5, 1979

[54] SINGLE TUBE COLOR TELEVISION CAMERA WITH COLOR CORRECTION

[75] Inventors: Ryuhei Nakabe; Hiromichi Tanaka, both of Hirakata, Japan

[73] Assignee: Matsushita Electric Industrial Co., Ltd., Osaka, Japan

[21] Appl. No.: 818,931

[22] Filed: Jul. 25, 1977

[30] Foreign Application Priority Data

Jul. 28, 1976 [JP] Japan ............................ 51-90633

[51] Int. Cl.² ..................................... H04N 9/07
[52] U.S. Cl. ............................................ 358/44
[58] Field of Search .................. 358/27, 43, 40, 44, 358/47

Primary Examiner—Robert L. Richardson
Attorney, Agent, or Firm—Wenderoth, Lind & Ponack

[57] ABSTRACT

The present invention is a color television camera employing a single pick-up tube and producing color component signals utilizing a difference of phase relationships of the modulated color signals, at least one of which changes in successive horizontal scan lines. In such a color television camera, the amplitude of a modulated component signal is controlled by a color error correction signal which is produced from the unmodulated component signals derived from adjacent horizontal line scans, so that color error components are not carried into the color component signals.

13 Claims, 15 Drawing Figures

(PRIOR ART)

(PRIOR ART)

SINGLE TUBE COLOR TELEVISION CAMERA WITH COLOR CORRECTION

BACKGROUND OF THE INVENTION

This invention relates to a color television camera in which the color component signals representing the first and second colors of a color image are reproduced utilizing the difference of modulation phase relationships of the color component signals, at least one of which changes in successive scan lines.

A color television camera of the type employing a single pick-up tube for producing a color video signal by processing successive line signals produced by line scans is shown, for instance, in the U.S. Pat. No. 3,647,943 or Japanese Published Pat. No. 45-8699. In those cameras, the first color of the color image, such as red, is spatially modulated by a first striped color filter so as to have a first phase relationship, such as an in phase relationship, in successive scan lines, and the second color of the color image, such as blue, is spatially modulated by a second striped color filter so as to have a second phase relationship, such as an opposite phase relationship, in successive scan lines. As well known in the art, such a first striped filter may be a W-Ye striped filter disposed perpendicular to the direction of horizontal scanning and containing a plurality of striped filter element pairs, W-elements which are transparent, and Ye-elements which pass red and green light. The second filter may be a W-Cy striped filter disposed at a different angle from the W-Ye striped filter and containing a plurality of striped filter elements, W-elements, and Cy-elements which pass blue and green light.

Figure 1:
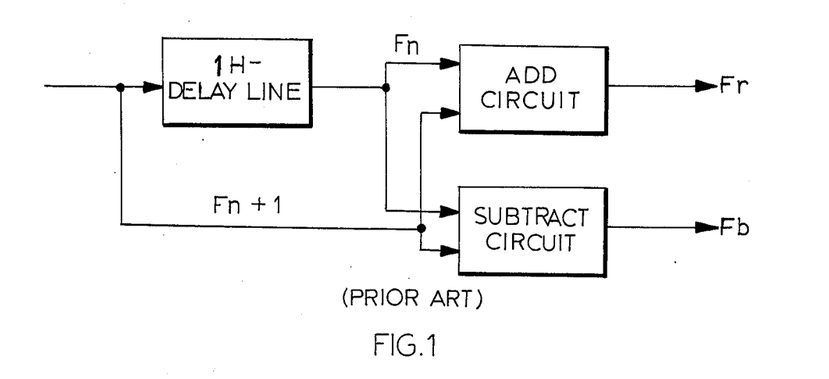
FIG. 1 is a block diagram showing a comb-filter of a color television camera according to the prior art.

A modulated component of the composite signal produced by line scans of the pick-up tube is provided to a comb-filter comprising a delay line (1H-delay line) which has a delay time of one horizontal scanning period, an adder and a subtractor, such as shown in FIG. 1, to recover the first and second color component signals. Then the color component signals are combined with a luminance signal derived from the composite signal to produce color difference signals.

Figure 2A:
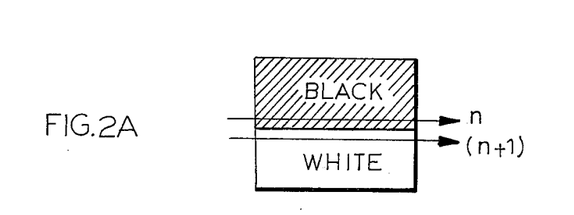
FIG. 2A and FIG. 2B are schematic diagrams showing examples of optical image patterns.

In such a color television camera, when the video pattern of the color image has no relationship or even a partial relationship, such as a bar pattern including the vertical edge portions therein, in successive lines of scan, such as shown in FIG. 2A, color errors take place at the edge portions in the reproduced color image on the picture screen of the color television reproducing apparatus. The color error is especially conspicuous when the optical image includes black and white patterns.

Supposing that the n-th horizontal line scan occurs on a block area with a reflectivity of 10% and the (n+1)-th horizontal line scan on a white area with a reflectivity of 90%, the modulated component signals derived from the pick-up tube are expressed by the following equations:

$$Fn = 0.1 \cdot \{R \cdot \sin \omega t + B \cdot \sin (\omega t + \phi)\} \quad (1)$$

$$Fn+1 = 0.9 \cdot \{R \cdot \sin \omega t + B \sin (\omega t + \pi + \phi)\} \quad (2)$$

where R and B denote the red and blue components respectively, and $\Phi$ denotes a phase constant determined by the position of the line scans. These signals which appear at the input terminal and the output terminal, respectively, of the delay line (1H-delay line) are added to and substracted from each other in the comb-filter, to produce red component signal Fr and blue component signal $F_b$, respectively, as follows:

$$Fr = 0.5 \cdot R \cdot \sin \omega t - 0.4 \cdot B \cdot \sin (\omega t + \phi)$$

$$Fb = -0.4 \cdot R \cdot \sin \omega t + 0.5 \cdot B \cdot \sin (\omega t + \phi)$$

where each coefficient of R or B is converted so that it becomes unity when the video patterns scanned in the successive line scans are correlated to each other.

Figure 3:
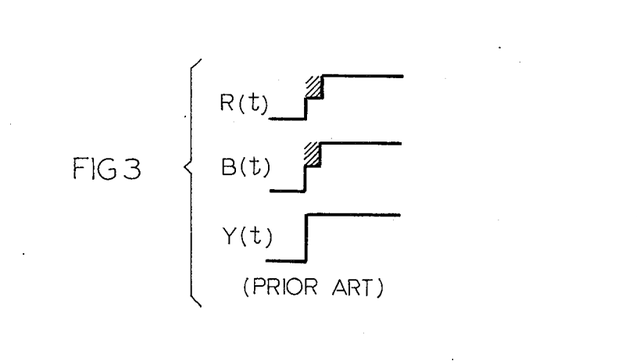
FIG. 3 is a set of diagrams of reproduced color component signals and the luminance signal in the color television camera shown in FIG. 1 when the image pattern shown in FIG. 2A is scanned.

Therefore, if the ratio R:B equals 1:1, the amplitude of the detected color component signals R(t) and B(t) changes stepwise at such an edge portion, such as shown in FIG. 3. This change in level occurs because the color television camera employed in this system must combine the signals from two successive scans in order to produce the color component signals R(t) and B(t). The average level of the edge portion is half that of the correlated pattern. In contrast, in the luminance signal derived from a low pass filter from the output signal of the pick-up tube, such a change of the level does not occur even at the edge portion. This is because the luminance signal is derived from individual scans without requiring a combination of successive scans. In the television camera employed in this system the color difference signals are produced from the color component signals R(t) and B(t) and the luminance signal Y(t). When two successive scans are uncorrelated or only partially correlated the color component signals R(t) and B(t) produced from those successive scans are based on an artificially averaged video pattern of the two successive scans differing from the real video pattern of either of the two successive scans. As the result, a color error component is carried into the color difference signals at the edge portion of the optical image pattern.

There has been proposed an apparatus for suppressing such color errors in U.S. Pat. No. 4,104,679 issued to Kitamura, one of whose joint inventors is a joint inventor of the present invention. According to the apparatus proposed in U.S. Pat. No. 4,109,679, edge portions are detected by processing the luminance signal, and the detection signal is utilized to control the wave shape of the luminance signal used to reproduce the color signals, the wave shapes of the color component signals derived by the comb-filter, or both. This apparatus is effective when the signal ration R:B is about 1:1 and $\phi$ is nearly constant. However, the ratio is not always 1:1, but varies with the color temperature of the light source, the characteristics of each pick-up tube and also with the kind of pick-up tube. Moreover it is difficult to maintain $\phi$ constant due to scanning distortion of the vertical deflection device.

SUMMARY OF THE INVENTION

An object of the invention, therefore, is to provide a color television camera in which color error components are suppressed in a process for deriving color component signals from the output signal of a pick-up device.

According to this invention, edge portions in an optical image pattern are detected by processing the unmodulated signal such as the luminance signal to generate a color error correction signal, and the correction signal is utilized to control the amplitude of the modulated component signal so that the color error components are not carried into color component signals.

The above and other objects, features and advantages will become readily apparent from the following description of some practical embodiments of the invention.

DESCRIPTION OF THE PREFERRED EMBODIMENTS

Figure 4:
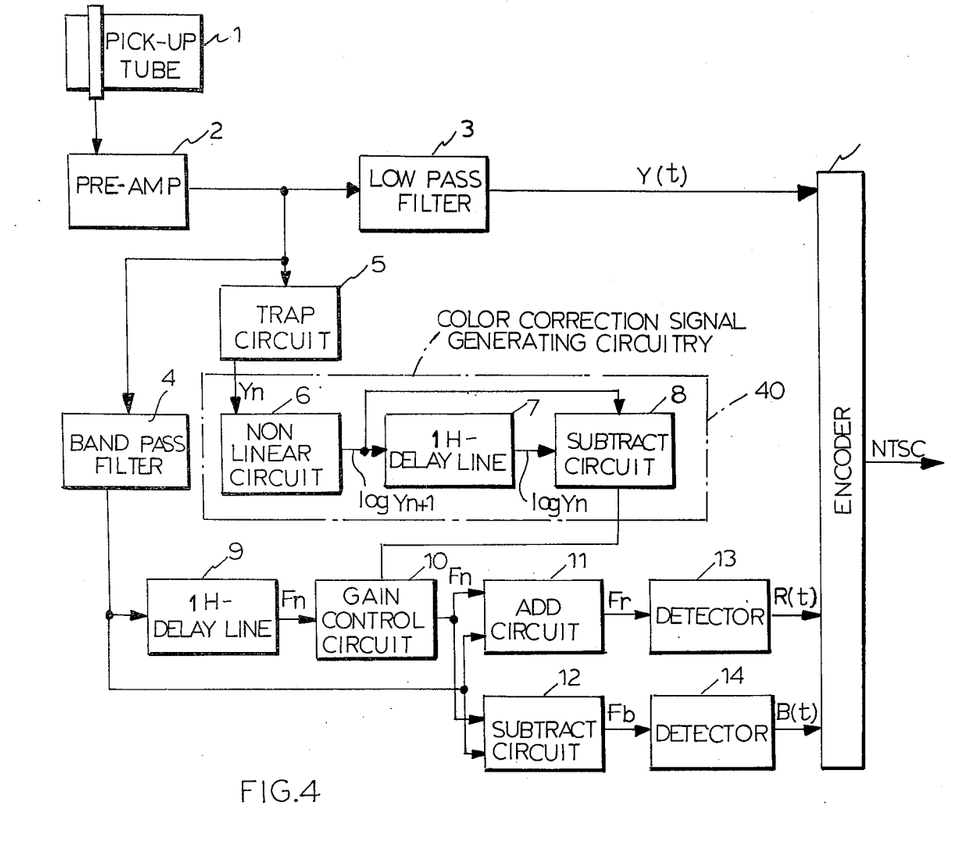
FIG. 4 is a block diagram showing the construction of an embodiment of a color television camera according to the invention.

In the embodiment of the invention, shown in FIG. 4, the optical color image is spatially modulated by the W-Ye striped filter and the W-Cy striped filter built into the pick-up tube 1, so that the pick-up tube 1 produces an output signal including the modulated component signal and the unmodulated component signal in the same manner as the abovedescribed color television camera. The output signal from the pick-up tube 1 is amplified by a pre-amplifier 2 then supplied to a low-pass filter 3 which removes the modulated component to produce the luminance signal Y(t). The output signal from the pre-amplifier 2 is also supplied to a band-pass filter 4 which derives the modulated component signal from the output signal, and to a trap circuit 5 which removes the modulated component signal in the same manner as the low-pass filter 3. The output of the trap circuit 5, which represents the luminance of the color image, is supplied to color correction signal generating circuitry 40 which detects the portions in which the image has no correlation in successive scan lines and generates a color error correction signal by operating upon adjacent lines of signals. In this embodiment the circuitry 40 consists of a non-linear circuit 6 having a logarithmic input-to-output characteristic, a delay line 7 delaying the output of the non-linear circuit 6 by one horizontal scanning period, and a subtract circuit 8 subtracting the output of the delay line 7 from the output of the non-linear circuit 6 to generate the color error correction signal.

The modulated component signal from the band-pass filter 4 is delayed by one horizontal scanning period by a delay line 9 then supplied through a gain control circuit 10 to an add circuit 11 and a subtract circuit 12, both of which are also supplied with the output of bass-pass filter 4. The delay line 9, the add circuit 11 and the subtract circuit 12 constitute a comb-filter such as shown in FIG. 1. Color component signals R(t) and B(t) are derived from detectors 13 and 14 by detecting the outputs from the add circuit 11 and the subtract circuit 12, respectively.

The gain control circuit 10 controls the amplitude of the delayed modulated component signal in accordance with the color error correction signal, so that the color error components are suppressed in the outputs of the add circuit 11 and the subtract circuit 12. In this case the gain control circuit has exponential characteristics with respect to the color correction signal.

For instance, if the modulated component signal is given by the equations (1) and (2) in successive scan lines the gain control circuit amplifies the delayed signal by nine times so that the output thereof is expressed as:

$$F_n = 0.9 \cdot \{R \cdot \sin \omega t + B \cdot \sin (\omega t + \phi)\}.$$

Since $F_n$ and $F_{n+1}$ are operated upon in the add circuit 11 and the subtract circuit 12, the modulated color component signals Fr and Fb can be expressed by following equations, in which the color error components are cancelled.

$$Fr = 0.9 \cdot R \cdot \sin \omega t$$

$$Fb = 0.9 \cdot B \cdot \sin (\omega t + \phi)$$

The detected color component signals R(t) and B(t) from the detectors 13 and 14 are provided to an encoder 15 along with the luminance signal Y(t) from the low-pass filter 3 to produce a color video signal, such as the NTSC signal.

Figure 2B:
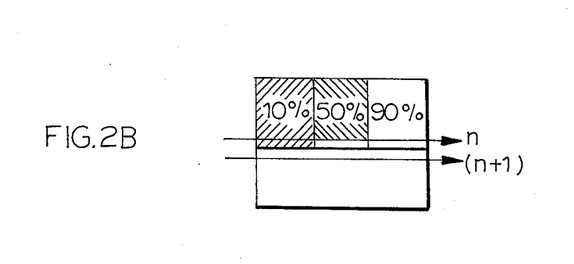
Figure 5A:
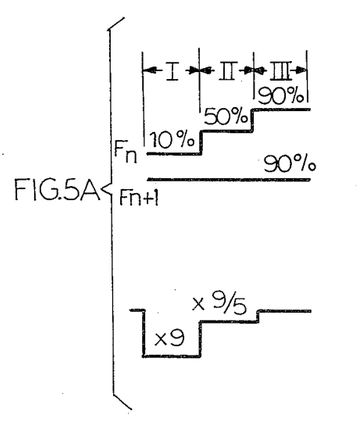
FIG. 5A, FIG. 5B and FIG. 5C are diagrams of the modulated component signals produced in the television camera of FIG. 4 when the optical image pattern of FIG. 2B is scanned.
Figure 5B:
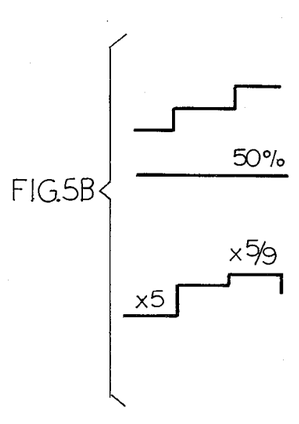
Figure 5C:
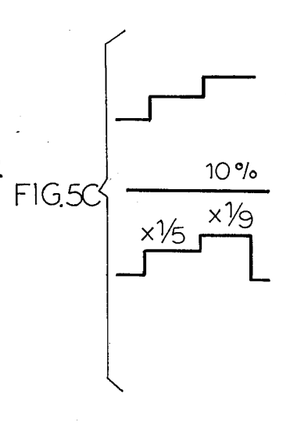

When the n-th horizontal line scan occurs on an area in which the reflectivity of the image changes in the sequence 10%-50%-90% in the horizontal direction, and (n+1)-th horizontal scan occurs on an area in which the reflectivity is 90%, such as shown in FIG. 2B, the amplitudes of the modulated component signals $F_n$ and $F_{n+1}$ are such as shown in FIG. 5A. As is obvious from these figures the modulated component signal $F_n$ includes a first portion I, a second portion II and third portion III with a reflectivity of 10%, 50% and 90%, respectively. In this case the modulated component signal $F_n$ from the delay line 9 requires amplification by gain control circuit 10 by nine times during the first portion and nine fifth times during the second portion in order to prevent color error components both in the add circuit 11 and the subtract circuit 12. Similarly, when the reflectivity during the (n+1)-th horizontal line scan is 50%, the signal Fn requires amplification by five times during the first portion and attenuation to five ninths thereof during the third portion in order to prevent color error components in the color component signals, such as shown in FIG. 5B. When the reflectivity during the (n+1)-th horizontal line scan is 10% the signal $F_n$ requires attenuation to one fifth thereof during the second portion and one ninth thereof during the third portion, such as shown in FIG. 5C. Such amplification and attenuation are accomplished by the gain control circuit 10 in accordance with the color error correction signal produced by the subtract circuit 8.

Figure 6:
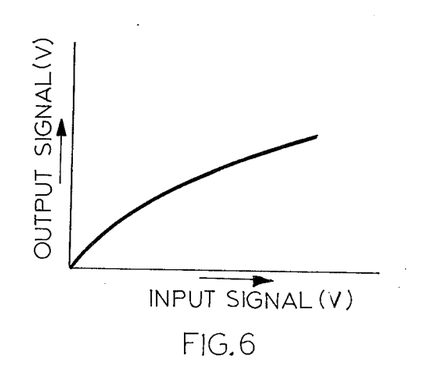
FIG. 6 is a schematic diagram showing the characteristics of the non-linear circuit 6 of FIG. 4.
Figure 7:
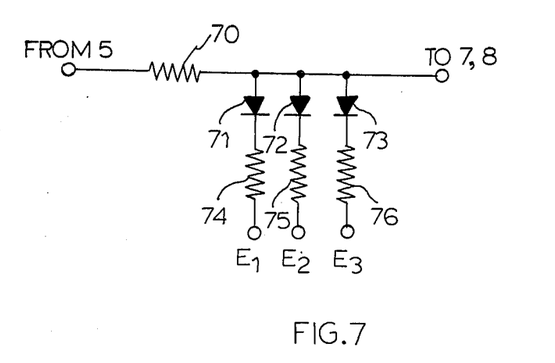
FIG. 7 is a circuit diagram showing the construction of the non-linear circuit 6 of FIG. 4.

FIG. 6 indicates the characteristics of the non-linear circuit 6 and FIG. 7 illustrates the circuit diagram thereof. In FIG. 7, numerals 70, 74, 75 and 76 represent resistances, 71, 72 and 73 represent diodes and $E_1$, $E_2$ and $E_3$ represent d-c voltage sources. In accordance with the logarithmic characteristics of FIG. 6, the unmodulated component signal from the trap circuit 5 is attenuated in proportion to the increase in amplitude. The output C from the subtract circuit 8, therefore the color error correction signal, is expressed as:

$$C = \log Y_{n+1} - \log Y_n$$
$$= \log Y_{n+1}/Y_n$$

where $Y_{n+1}$ and $Y_n$ represent the unmodulated component signals which are derived from the trap circuit 5 by the (n+1)-th and n-th horizontal line scans, respectively.

If the image is black and white or of similar color content, the ratio $Y_{n+1}:Y_n$ equals or nearly equals the ratio $|F_{n+1}|:|F_n|$. Since the gain of the gain control circuit 10 changes in accordance with the exponential characteristic thereof with respect to the color error correction signal, the amplitude of the modulated component signal from the delay line 9 must be multiplied by $|F_{n+1}|/|F_n|$ to be equal to that of the undelayed modulated component signal from the band-pass filter 4. As the result, no color error components appear in the outputs of the add circuit 11 and the subtract circuit 12. By removing the color errors which may occur more conspicuously in the black and white pattern and the color constant patterns, the quality of the reproduced image on the picture screen is greatly improved.

Figure 8:
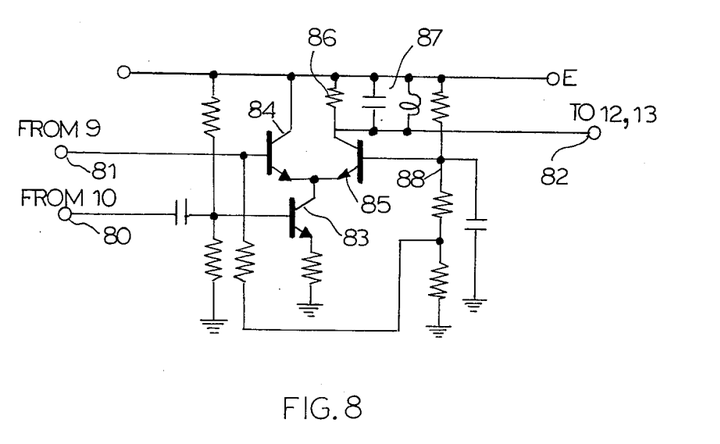
FIG. 8 is a circuit diagram showing the construction of a gain control circuit of an embodiment of the invention.

FIG. 8 illustrates the circuit diagram of the gain control circuit 10 according to this embodiment of the invention, which consists essentially of a differential amplifier. In FIG. 8 the modulated component signal from the delay line 10 is provided through an input terminal 80 to the base electrode of a transistor 83 the collector electrode of which is connected to the common emitter electrodes of transistors 84 and 85. An output terminal 82 is connected to the junction point of a load resistance 86 and the collector electrode of the transistor 85 through a band-pass filter 87.

Figure 9:
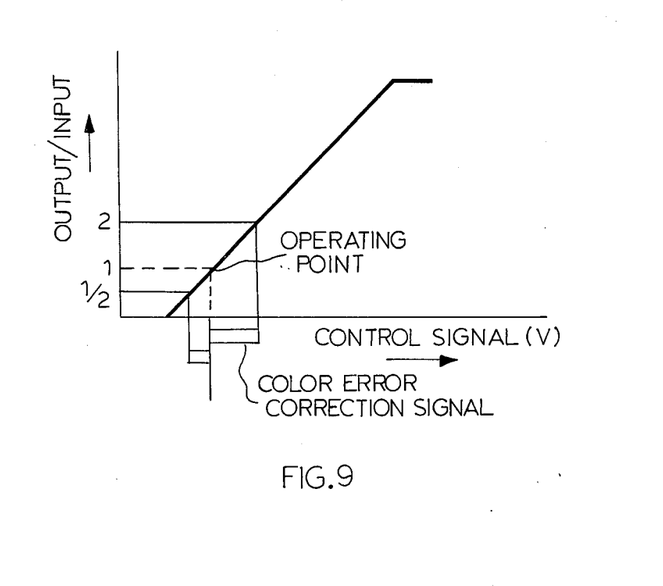
FIG. 9 is a schematic diagram showing the characteristics of the gain control circuit of FIG. 8.

As is known, the gain of such a differential amplifier is controlled by a control signal which is supplied to the base electrode of the transistor 84 through a control terminal 81. The characteristics of the differential amplifier is shown in FIG. 9. The control signal, in this case, is the color error correction signal from the color correction signal generating circuitry and the operating point of the differential amplifier is set by the bias resistances 88 to make full use of the controllable range of the gain control circuit. It is obvious from FIG. 9, that the gain of circuit changes linearly in proportion to the control signal. Therefore the amplitude of the color error correction signal should be different in the amplification mode and than in the attenuation mode of the amplifier even if ratios of amplification and the attenuation are the same.

Figure 10:
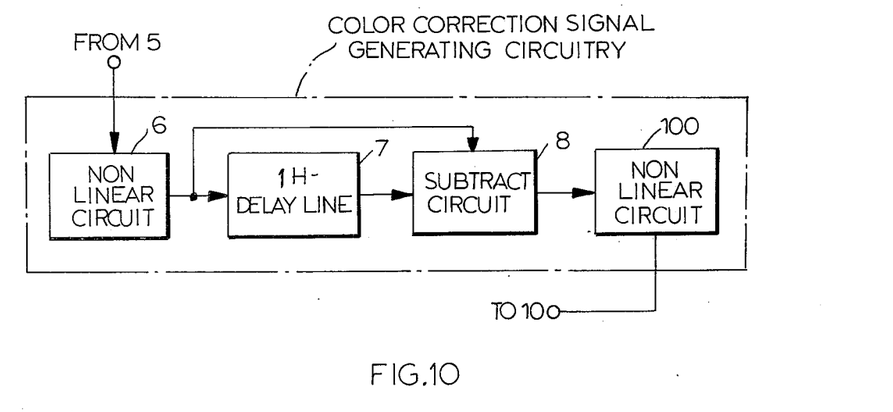
FIG. 10 is a block diagram showing the construction of a color correction signal generating circuitry of the another embodiment of the invention.
Figure 11:
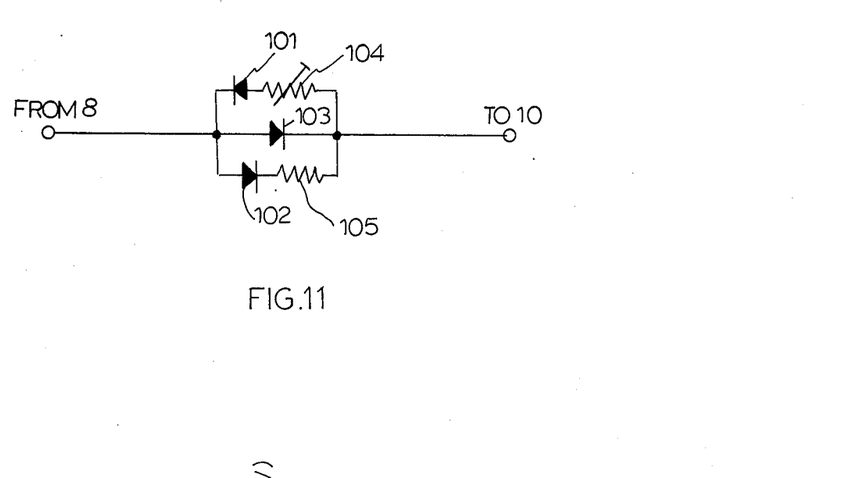
FIG. 11 is a circuit diagram showing the construction of the non-linear circuit 100 of the embodiment of FIG. 10.
Figure 12:
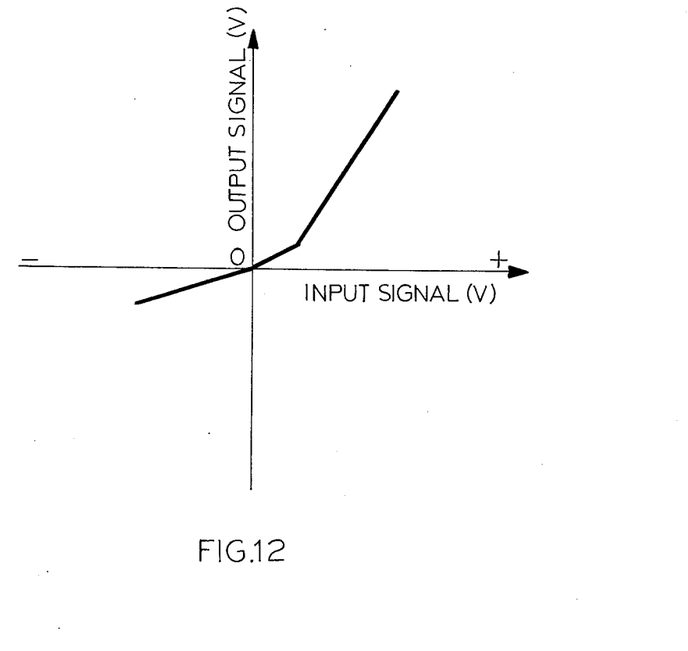
FIG. 12 is a diagram showing the characteristics of the non-linear circuit 10 of FIG. 11.

The color correction signal generating circuitry required for this embodiment, therefore, further comprises a non-linear circuit 100 coupled between the subtract circuit 8 and the gain control circuit 10, such as shown in FIG. 10. The construction and the input-to-output characteristics thereof are illustrated in FIG. 11 and FIG. 12, respectively. In FIG. 11, the output signal from the subtract circuit 8 the quiescent level of which signal is clamped at a reference voltage such as zero volts is supplied to germanium diodes 101 and 102 and a silicon diode 103. The negative portion of the signal is attenuated by the germanium diode 101 and a pre-set variable resistance 104 with respect to the positive portion. The gradient and the shape of the curve representing the characteristics of FIG. 12 are adjusted by the pre-set resistance 104, a fixed resistance 105 and the diodes 101, 102 and 103. If necessary an additional non-linear circuit having an exponential input-to-output characteristic is connected between the subtract circuit 8 and the gain control circuit 10 in series with the non-linear circuit 100.

Though in the above described embodiment the gain control circuit is coupled between the delay line 9 and the operating circuits 11 and 12, it may be connected between the band-pass filter 4 and the delay line 9. It is also possible to connect the gain control circuit between the band-pass filter 4 and the operating circuits 11 and 12 in parallel with the delay line 9. In the latter case the gain control circuit must control the amplitude of the modulated component signal $F_{n+1}$ to be equal to that of the modulated component signal $F_n$.

Although this invention has been particularly shown and described, it is contemplated that various changes and modifications may be made without departing in any way from the scope of the invention as set forth in the following claims.

The embodiments of the invention in which an exclusive property or privilege is claimed are defined as follows:

1. A color television camera in which at least a first and a second color are spatially modulated in a pick-up tube by color filter means so that at least one of the modulated signals representing the first and second colors has a phase which is different from the phase of the same color in adjacent scan lines and color signals are produced utilizing the difference in phases in successive scan lines, said color television camera comprising:

a circuit means for receiving an output from the pick-up tube for deriving therefrom an unmodulated component signal;

a filter circuit means for receiving an output from the pick-up tube for deriving therefrom a modulated component signal;

a color correction signal generating means coupled to said circuit means and receiving said unmodulated component signal for operating upon said unmodulated component signal to generate a color error correction signal;

a coupling means coupled to said filter circuit means and to said color correction signal generating means for developing a delayed modulated component signal which is delayed from said modulated component signal by one horizontal scanning period, and for controlling the amplitude of at least one of said modulated component signal and said delayed modulated component signal with said color error correction signal from said color correction signal generating means; and a processing means coupled to said coupling means and receiving said modulated component signal and said delayed modulated component signal for production of color signals.

2. A color television camera as claimed in claim 1 wherein said coupling means comprises:
- a delaying means coupled to said filter circuit means for delaying said modulated component signal therefrom by one horizontal scanning period to generate said delayed modulated component signal;
- a gain control means coupled to said delaying means and said color correction signal generating means for controlling the amplitude of said delayed modulated component signal; and
- a coupling circuit means coupled to said filter circuit means for coupling said modulated component signal to said processing means.

3. A color television camera in which at least a first and a second color are spatially modulated in a pick-up tube by color filter means so that at least one of the modulated signals representing the first and second colors has a phase which is different from the phase of the same color in adjacent scan lines and color signals are produced by utilizing the difference in phases in successive scan lines, said color television camera comprising:
- a circuit means for receiving an output from the pick-up tube for deriving therefrom an unmodulated component signal;
- a filter circuit means for receiving an output from the pick-up tube for deriving therefrom a modulated component signal;
- a color correction signal generating means coupled to said circuit means and receiving said unmodulated component signal for operating upon said unmodulated component signal to generate a color error correction signal;
- a first coupling means coupled to said filter circuit means and receiving said modulated component signal, including a delay line for delaying said modulated component signal by one horizontal scanning period;
- a second coupling means coupled to said filter circuit means and receiving said modulated component signal;
- a processing means coupled to said first coupling means and second coupling means for operating upon said delayed modulated component signal and said modulated component signal therefrom for producing color signals; and
- a control circuit means coupled between said filter circuit means and said processing means in series with at least one of said first coupling means and said second coupling means and also coupled to said color correction signal generating means for controlling the amplitude of at least one of said delayed modulated component signal and said modulated component signal in accordance with said color error correction signal and for causing the color error components to be suppressed in said color signals by said processing means.

4. A color television camera as claimed in claim 3, wherein said color correction signal generating circuit means comprises:
- a delaying means coupled to said circuit means for delaying said unmodulated component signal therefrom by one horizontal scanning period; and
- an operation circuit means coupled to said delaying means and said circuit means for operating upon said delayed unmodulated component signal and said modulated component signal therefrom to generate said color error correction signal.

5. A color television camera as claimed in claim 4 wherein said operation circuit means consists of a subtractive circuit for subtracting said delayed unmodulated component signal from said unmodulated component signal.

6. A color television camera as claimed in claim 3, wherein said color correction signal generating means comprises:
- a non-linear circuit coupled to said circuit means for attenuating said unmodulated component signal therefrom in proportion to the increase in amplitude of said unmodulated component signal;
- a delay line coupled to said non-linear circuit for delaying said unmodulated component signal therefrom by one horizontal scanning period; and
- a subtracting circuit coupled to said non-linear circuit and said delay line for subtracting said delayed unmodulated component signal therefrom from said unmodulated component signal therefrom for generating said color error correction signal.

7. A color television camera as claimed in claim 6 wherein said color correction signal generating means further comprises a second non-linear circuit coupled between said subtracting circuit and said control circuit means for attenuating one of the polarities of said color error correction signal with respect to the other polarity thereof.

8. A color television camera as claimed in claim 3 wherein said processing means comprises;
- an adding circuit means coupled to said first and second coupling means for adding the signals therefrom to produce a first color signal; and
- a subtractive circuit means coupled to said first and second coupling means for subtracting the signals therefrom to produce a second color signal.

9. A color television camera in which at least a first and a second color are spatially modulated in a pick-up tube by color filter means so that at least one of the modulated signals representing the first and second colors has a phase which is different from the phase of the same color in adjacent scan lines and color signals are produced by utilizing the difference in phases in successive scan lines, said color television camera comprising:
- a first filter means for receiving an output of the pick-up tube for producing a luminance signal representing the luminance of the color image;
- a circuit means for receiving an output from the pick-up tube for deriving therefrom an unmodulated component signal;
- a second filter means receiving an output from said pick-up tube for deriving therefrom a modulated component signal;
- a color correction signal generating means coupled to said circuit means and receiving said unmodulated component signal for operating upon said unmodulated component signal to generate a color error correction signal;
- a first coupling means coupled to said second filter means and receiving said modulated component signal, including a delay line for delaying said modulated component signal by one horizontal scanning period;

a second coupling means coupled to said second filter circuit means and receiving said modulated component signal;

a processing means coupled to said first and second coupling means for operating upon said delayed modulated component signal and said modulated component signal therefrom for producing color component signals;

a control circuit means coupled between said second filter means and said processing means in series with at least one of said first and second coupling means and also coupled to said color correction signal generating means for controlling the amplitude of at least one of said delayed modulated component signal and said modulated component signal in accordance with said color error correction signal; and an encoding means coupled to said first filter means and said processing means for combining the signals therefrom to produce a color video signal.

10. A color television camera in which at least a first and a second color are spatially modulated in a pick-up tube by color filter means so that at least one of the modulated signals representing the first and second colors has a phase which is different from the phase of the same color in adjacent scan lines and color signals are produced by utilizing the difference in phases in successive scan lines, said color television camera comprising:

a first circuit means coupled to the pick-up tube for deriving therefrom an unmodulated component signal;

a second circuit means coupled to the pick-up tube for deriving therefrom at least a modulated component signal;

a color correction signal generating means coupled to said first circuit means for operating upon said unmodulated component signal to generate a color error correction signal;

a coupling means coupled to said second circuit means and said color correction signal generating means for receiving at least said modulated component signal and said color error correction signal and for controlling the amplitude of at least said modulated component signal in accordance with said color error correction signal;

a processing means coupled to said coupling means for operating upon the output therefrom to produce color signals.

11. A color television camera as claimed in claim 10 wherein said coupling means comprises:

a first coupling means coupled to said second circuit means and including a delay line for delaying said modulated component signal by one horizontal scanning period;

a second coupling means coupled to said second circuit means for coupling said modulated component signal to said processing means; and a gain control circuit means coupled between said second circuit means and said processing means in series with at least one of said first and second coupling means and also coupled to said color correction signal generating means for controlling the amplitude of at least one of said delayed modulated component signal and said modulated component signals.

12. A color television camera as claimed in claim 10 wherein said color correction signal generating means comprises:

a delaying means coupled to said first circuit means for delaying said unmodulated component signal by one horizontal scanning period; and an operating circuit means coupled to said first circuit means and said delaying circuit means for operating upon signals therefrom to generate said color error correction signal.

13. A color television camera as claimed in claim 10 wherein said color correction signal generating means comprises:

a first non-linear circuit means coupled to said first circuit means for attenuating said unmodulated component component signal therefrom in proportion to the increase in amplitude of said unmodulated component;

a delaying means coupled to said first non-linear circuit means for delaying said unmodulated component therefrom by one horizontal scanning period;

a subtracting circuit means coupled to said first non-linear circuit means and said delaying means for subtracting said delayed unmodulated component signal therefrom from said unmodulated component signal therefrom; and a second non-linear circuit means coupled to said subtracting circuit means for attenuating one of the polarities of the output signal from said subtracting circuit means with respect to the other polarity thereof.

* * * * *